United States Patent
Black et al.

(10) Patent No.: US 11,252,139 B2
(45) Date of Patent: Feb. 15, 2022

(54) DISTRIBUTED AUTHENTICATION/AUTHORIZATION TOOL

(71) Applicant: Bank of America Corporation, Charlotte, NC (US)

(72) Inventors: Christine D. Black, Brooksville, ME (US); Morgan S. Allen, Charlotte, NC (US); Manu Kurian, Dallas, TX (US)

(73) Assignee: Bank of America Corporation, Charlotte, NC (US)

( * ) Notice: Subject to any disclaimer, the term of this patent is extended or adjusted under 35 U.S.C. 154(b) by 382 days.

(21) Appl. No.: 16/285,509

(22) Filed: Feb. 26, 2019

(65) Prior Publication Data

US 2020/0274861 A1   Aug. 27, 2020

(51) Int. Cl.
H04L 29/06   (2006.01)
G06N 20/00   (2019.01)

(52) U.S. Cl.
CPC ............. *H04L 63/08* (2013.01); *G06N 20/00* (2019.01); *H04L 63/10* (2013.01)

(58) Field of Classification Search
CPC ..... H04L 63/08; H04L 63/10; H04L 63/0807; G06N 20/00; G06N 5/046; G06Q 50/265; G06F 21/6245
See application file for complete search history.

(56) References Cited

U.S. PATENT DOCUMENTS

| | | | |
|---|---|---|---|
| 6,816,905 | B1 | 11/2004 | Sheets et al. |
| 6,938,021 | B2 * | 8/2005 | Shear ................. G06Q 20/3674 705/67 |
| 7,640,190 | B1 | 12/2009 | Sullivan et al. |
| 7,664,689 | B1 | 2/2010 | Rosenfield et al. |
| 7,860,227 | B2 | 12/2010 | Falcone et al. |
| 8,255,336 | B2 | 8/2012 | Dilip et al. |
| 8,266,065 | B2 | 9/2012 | Dilip et al. |
| 8,566,248 | B1 | 10/2013 | Steele et al. |
| 8,706,622 | B2 | 4/2014 | Winters et al. |
| 8,788,819 | B2 | 7/2014 | Broder et al. |
| 9,705,736 | B2 | 7/2017 | Wang et al. |
| 10,103,936 | B2 | 10/2018 | Kurian et al. |
| 2017/0076271 | A1 | 3/2017 | Jones-Mcfadden et al. |
| 2017/0076379 | A1 | 3/2017 | Wadley et al. |
| 2017/0244672 | A1 * | 8/2017 | Shulman ............. H04L 12/4633 |
| 2018/0040062 | A1 | 2/2018 | Dintenfass et al. |

* cited by examiner

*Primary Examiner* — Khoi V Le

(57) ABSTRACT

An authentication/authorization tool authenticates entity data received from an official third party and authorizes the distribution of the authenticated data based on an authorization token provided by a mobile device of the entity. The tool determines, based on the entity data and an entity preferences database, different portions of the entity data that are of different data types and data repositories that are authorized to receive each data type. The tool receives an authorization token from a mobile device of the entity and uses the authorization token to determine whether data distribution is authorized. Responsive to determining, based on the data authorization token, that distribution of the data is authorized, the tool automatically transmits the data portions to the entity's data repositories to update information stored therein, according to preferences of the entity.

20 Claims, 4 Drawing Sheets

DISTRIBUTED AUTHENTICATION/AUTHORIZATION TOOL

TECHNICAL FIELD

This disclosure relates generally to tools used for the authentication of data and authorization of its distribution. In particular embodiments, the present disclosure is related to a tool that more efficiently and securely authenticates data for an entity and authorizes its distribution to a plurality of repositories according to preferences of the entity.

BACKGROUND

Increasingly entity information is stored in network-connected repositories which may be accessed by the entity to use services and to maintain information associated with the entity. Each repository generally stores information about the entity such as a name of the entity, a date of birth, an address, and the like. When a portion of this information changes, the entity generally must access and modify the repository for each service individually in order to ensure each repository has the most current and correct information. There is a need for improved tools and methods for maintaining and updating entity information across multiple data repositories.

SUMMARY OF THE DISCLOSURE

As described above, conventional systems and methods for maintaining entity information require the entity to maintain repositories individually. For example, an individual who has moved to a new place of residence might access a repository for a given service via a web browser to update the information stored therein. As part of this update, the individual may be required to present one or more forms of authentication evidence (e.g., a personal identification number, a social security number, a driver's license number, a date of birth, and one or more current and/or previous addresses). Using conventional systems, these tasks must be repeated by the entity to make corresponding changes to each of the entity's repositories.

Conventional systems and methods, such as those described above, pose several technical challenges. In a conventional system, an entity accesses each of his/her repositories by providing credentials (e.g., a password and username) before making desired changes to entity information. Conventional approaches result in an inefficient use of system resources because the same information is repeatedly communicated by the device of the entity in order to update all of the entity's repositories. Each redundant communication of this information also provides an opportunity for this information to be intercepted by bad actors. Moreover, anyone with access to the entity's credentials for a given repository can pose as the entity and make changes to information in the repository. In some cases, additional authentication information might be provided to improve the probability that information is authentic (i.e., entered by the actual entity). However, using conventional systems, the quality and reliability of authentication evidence provided directly from the entity is suspect because anyone with access to the appropriate credentials can pose as the entity.

The present disclosure provides a technical solution to the technical problems above by providing an authentication/authorization tool and associated methods for authenticating entity information from an official third party and distributing the authenticated information to a plurality of repositories based on authorization instructions from the entity, without requiring the entity to individually access and modify each repository. The authentication/authorization tool leverages the authentication activities performed at the official third party such that the authenticity of information received from the third party can be reliably confirmed. This mitigates problems of conventional systems where the authenticity of entity information can be difficult to ascertain.

As described in greater detail herein, the present disclosure improves the efficiency, security, and accuracy of the technology used to update and maintain information stored in the network-connected repositories of the entity. Efficiency is improved by streamlining how changes to information stored in repositories are authenticated and authorized using the unconventional combination of an authentication token from an official third party and an authorization token from a mobile device of the entity. Rather than requiring the entity to unnecessarily repeat authentication and authorization tasks for each repository, authentication evidence received from an official third party (i.e., as a secure authentication token) is combined with authorization instructions received from a mobile device of the entity (i.e., as a secure authorization token) so that the authentication/authorization tool can determine how and/or whether authenticated data should be distributed to a plurality of the entity's repositories. Accordingly, the authentication/authorization tool described herein more effectively and efficiently makes changes to information stored in each repository, while also improving the reliability and security of the changes.

By improving usability and removing the bottleneck imposed by conventional systems which require the individual maintenance of each of the entity's repositories, the authentication/authorization tool described herein may allow repositories to be updated which may otherwise be neglected by the entity. Moreover, since information received from the official third party is typically trusted and is often reviewed not only to confirm its authenticity but also its accuracy, the authentication/authorization tool decreases the probability that incorrect or inconsistent information is distributed to the entity's repositories compared to when the repositories are updated using conventional systems.

Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
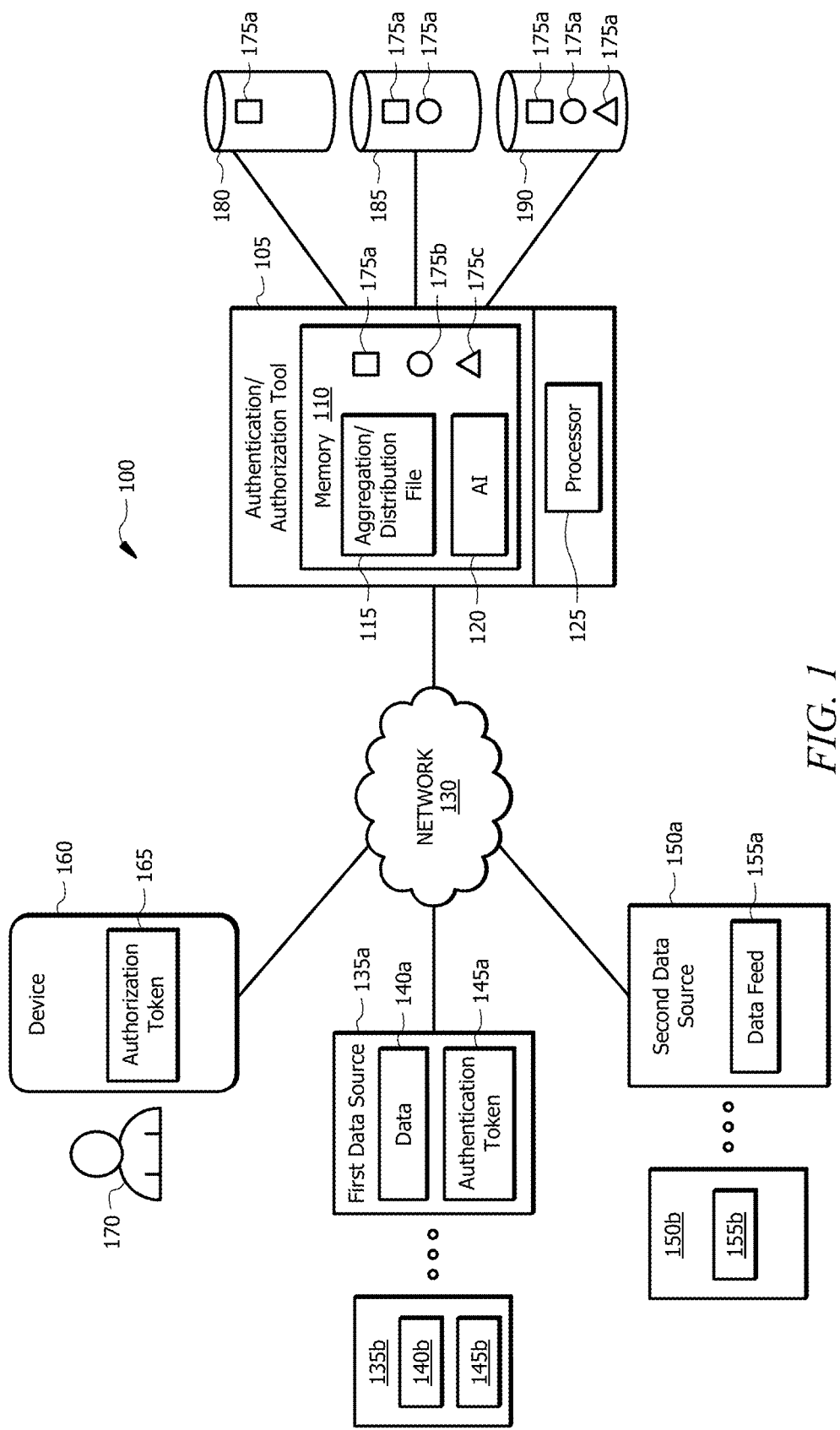
FIG. 1 is a block diagram of an example system, according to certain embodiments of the present disclosure.

Embodiments of the present disclosure and its advantages are best understood by referring to FIGS. 1 through 4 of the drawings, like numerals being used for like and corresponding parts of the various drawings.

As described in greater detail herein, the authentication/authorization tool of the present disclosure efficiently, securely, and accurately updates and maintains information stored in repositories for an entity. The tool receives data and an authentication token from a first data source of an official third party. For example, the official third party may be a government agency (e.g., a local Department of Motor Vehicles office, e.g., a post office) or another trusted organization that uses standard practices to verify information through the collection and verification of various forms of authentication evidence (e.g., a driver's license, a passport, a social security card, and/or a birth certificate). This authentication evidence may be tokenized or appropriately encrypted to generate an authentication token by the first data source. For instance, the authentication token may include one or more of a tokenized driver's license number, a tokenized social security number, a tokenized date of birth, or any other information used for data authentication. Upon receipt of the authorization token, the authentication/authorization tool "detokenizes" the authentication token to return to its original, reviewable form and evaluates the authentication evidence. This allows the authentication/authorization tool to effectively leverage the results of authentication tasks performed at the official third party such that further or repeated authentication is not required when the data is distributed to the entity's repositories.

The present disclosure further encompasses means for accurately and securely distributing the authenticated information for the entity to a plurality of (e.g., two or more) repositories based on an authorization and distribution preferences from the entity. The entity's distribution preferences may be stored in an entity preferences database and/or may be embedded within an authorization token received from a mobile device of the entity. In general, the repository for a given service may store several types of information, and the entity may have different security preferences for how each type of information is distributed to the associated repositories. Thus, information is needed regarding which type of information (and what portion of the authenticated information) is provided to which repository of the entity's plurality of repositories. The authorization token provides at least a portion of this information to the authentication/authorization tool to facilitate the determination of which portion(s) of the authenticated information from the official third party are served to each repository. The authorization token may be received (e.g., in near real time) from the entity via an application running on a mobile device of the entity or via a web browser.

In some embodiments, the entity is an individual who can configure his/her preferences for how information is distributed amongst his/her various repositories. These settings may be stored in an entity preferences database and accessed as required by the authentication/authorization tool for distribution of data according to the predefined instructions for the entity. When the authorization token is received from the entity, the authentication/authorization tool uses these preferences to determine how different portions of the authenticated data are distributed to the entity's repositories. In some embodiments, an entity (e.g., an individual or representative of a business) updating information at an official third party may receive a request on his/her mobile device from the authentication/authorization tool to authorize distribution of the information to one or more of the individual's repositories, according to his/her preferences. The entity may provide the authorization to an application running on the mobile device via a user interface. This authorization includes permission to distribute the information and may also include preferences or instructions (in addition to or in place of those stored in the entity preferences database) for the distribution of the data by the authentication/authorization tool.

Generally, information stored in a repository may have different security requirements, according to preferences of the entity. For example, as described with respect to the illustrative examples of FIGS. 1-4, the stored information may include public information, semi-private information, and private information. As an example, an individual's repository may store one or more of the individual's name, residential address, date of birth, social security number, similar information about family members or other associated individuals, and the like. A business entity may store similar information for one or more individuals associated with the entity as well as information related to the business and its operations (e.g., locations of branches and information about employees). Generally, an entity may wish public information to be distributed to repositories of all or most types, while distribution of the semi-private and private portions of the information is restricted to more limited sets of repositories, according to preferences of the entity. The authentication/authorization tool of the present disclosure facilitates the efficient and secure authentication and distribution of this information based on the entity's preferences and only after the entity has authorized said distribution.

FIG. 1 illustrates an example system 100, according to certain embodiments of the present disclosure. System 100 includes an authentication/authorization tool 105, a network 130, an entity device 160, one or more first (e.g., official) data sources 135*a,b*, one or more optional second (e.g., unofficial) data sources 150*a,b*, a first data repository 180, a second data repository 185, and a third data repository 190. In general, the authentication/authorization tool 105 allows data 140*a,b*, which is associated with an entity 170, to be authenticated and authorized for distribution as data portions 175*a-c* to desired data repositories 180, 185, 190, according to the preferences of the entity 170.

Authentication and authorization of the data 140*a,b* by the authentication/authorization tool 105 is based on an authentication token 145*a* from the first data source 135*a* and an authorization token 165 from a device 160 of the entity 170. For example, the authentication/authorization tool 105 may be used to update information for a plurality of repositories of entity 170, where each data repository 180, 185, 190 corresponds to a unique service. For example, a service may correspond to a product offered by a company or a branch of the company. In general, the repositories 180, 185, 190 are not necessarily linked to a single entity or company, and the repositories 180, 185, 190 do not need to be hosted or operated by the same entity operating the authentication/authorization tool 105.

Generally, the authentication/authorization tool 105 receives, via network 130, data 140*a,b* along with corresponding authentication token(s) 145*a,b* from the one or more first data sources 135*a,b* from one or more corresponding official third parties. The authentication/authorization tool 105 then authenticates the data 140*a,b* as authenticated data 175*a-c* according to information stored in the authentication/authorization file 115 (i.e., a file comprising an entity preferences database) before distributing the data 175*a-c* based on an authorization token 165 received from entity device 160. The authorization token 165 provides permission for the authentication/authorization tool 105 to distribute each portion of data 175*a-c* to the appropriate repositories 180, 185, 190, according to distribution preferences of the entity 170. The authentication/authorization tool distributes the authenticated data 175*a-c* to the various repositories 180, 185, 190 based on these distribution preferences. Thus, the entity 170 does not need to individually access each of the repositories 180, 185, 190 to update the information stored therein. Instead, the authentication/authorization tool 105 leverages authentication task(s) performed at the official third party associated with the first data source 135*a* and an authorization from the entity 170 to more efficiently and accurately maintain the information in each of the repositories 180, 185, 190 automatically.

The authentication/authorization tool 105 includes a memory 110 and a processor 125. The memory 110 stores an entity preferences database 115 and may also store an artificial intelligence module 120. The entity preferences database 115 includes information for authentication of received data 140*a,b* using the authentication token 145*a* and for distribution of authenticated data 175*a-c* to the data repositories 180, 185, 190. The authentication/authorization tool 105 generally uses information in the entity preferences database 115 to determine which portions of the received data 140*a,b* to retain and authenticate and in what format to store this data as authenticated data 175*a-c*. In certain embodiments, the authentication/authorization tool 105 uses the artificial intelligence module 120 to monitor one or more data feeds 155*a,b* of unofficial data sources 150*a,b*, as described in greater detail below. In general, the artificial intelligence module 120 provides additional techniques for validation, authentication, and/or authorization of data 140*a,b* for further improvement to the operation of the authentication/authorization tool 105.

Processor 125 is any electronic circuitry, including, but not limited to microprocessors, application specific integrated circuits (ASIC), application specific instruction set processor (ASIP), and/or state machines, that communicatively couples to memory 110 and controls the operation of authentication/authorization tool 105. Processor 125 may be 8-bit, 16-bit, 32-bit, 64-bit or of any other suitable architecture. Processor 125 may include an arithmetic logic unit (ALU) for performing arithmetic and logic operations, processor registers that supply operands to the ALU and store the results of ALU operations, and a control unit that fetches instructions from memory 110 and executes them by directing the coordinated operations of the ALU, registers and other components. Processor 125 may include other hardware and software that operates to control and process information.

Processor 125 executes software stored on memory 110 to perform any of the functions described herein. Processor 125 controls the operation and administration of authentication/authorization tool 105 by processing information received from first data sources 135*a,b*, second data sources 150*a,b*, device 160, network 130, and memory 110. Processor 125 may be a programmable logic device, a microcontroller, a microprocessor, any suitable processing device, or any suitable combination of the preceding. Processor 125 is not limited to a single processing device and may encompass multiple processing devices.

Memory 110 may store, either permanently or temporarily, data, operational software, or other information for processor 125. Memory 110 may include any one or a combination of volatile or non-volatile local or remote devices suitable for storing information. For example, memory 110 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory, a disk, a CD, or a flash drive. In particular embodiments, the software may include an application executable by processor 125 to perform one or more of the functions described herein.

The entity preferences database 115 and any other database(s) (not shown), stored in memory 110, generally include information used by the authentication/authorization tool 105 such as one or more tables used by automation tool 105. This disclosure contemplates entity preferences database 115 storing information arranged in any format. For example, entity preferences database 115 may store files, directories, and/or queues. The information stored in entity preferences database 115 may be used to authenticate data received from the one or more first data sources 135*a,b* and the one or more second data sources 150*a,b*. For example, entity preferences database 115 may store in tables information related to how data 140*a,b* and any data identified by artificial intelligence module 120 for data feeds 150*a,b* are authenticated, stored in the memory 110, and/or authorized for distribution by the authentication/authorization tool 105. For example, the tables may include information related to preferences of the entity 170 for how portions of authenticated data 175*a-c* should be distributed to repositories 180, 185, 190 (e.g., based on whether each portion contains public, semi-private, or private data for the entity 170). The entity preferences database 115 (and/or a database stored in the memory 110) may also include training data for training the artificial intelligence module 120. This training data may be continuously stored and updated during operation of authentication/authorization tool 120.

Entity device 160 may be any device capable of receiving an input from the entity (or its representative) corresponding to an authorization by the entity to distribute the portions of authenticated data 175*a-c* to one or more of the repositories 180, 185, 190. This disclosure contemplates device 160 being any appropriate device for sending and receiving communications over network 130. As an example and not by way of limitation, mobile device 160 may be a computer, a laptop, a wireless or cellular telephone, an electronic notebook, a personal digital assistant, a tablet, or any other device capable of receiving, processing, storing, and/or communicating information with other components of system 100. Device 160 may also include a user interface, such as a display, a microphone, keypad, or other appropriate terminal equipment usable by entity 170. In some embodiments, an application executed by device 160 may perform functions described herein. Entity 170 may provide the input via the user interface to an application running on the device 160.

Each of first data sources 135*a,b* is generally a computing device associated with an official third party, such as a government agency (e.g., a local Department of Motor Vehicles office) or another trusted organization that uses standard practices to verify information through the collection and verification of one or more forms of authentication evidence (e.g., a driver's license, a passport, a social security card, and a birth certificate). This authentication evidence may be tokenized or appropriately encrypted by the first data source(s) 135*a,b* to generate authentication token(s) 145*a,b*. For instance, the authentication token(s) 145*a,b* may include one or more of a tokenized driver's license number, a tokenized social security number, a tokenized date of birth, and any other information useful for data authentication for the entity 170. The authentication/authorization tool 105 can thus effectively leverage the results of one or more authentication tasks performed at the official third party such that further or repeated authentication is not required when the authenticated data 175a-c is distributed to the repositories 180, 185, and 190.

Each of the second data sources 135a,b is generally associated with an unofficial third party that provides source of data associated with the entity 170. For example, an unofficial third party may be a social media or news platform that hosts a data feed 155a,b that includes social media posts news reports, or the like. Although the information in data feeds 155a,b is typically "unofficial" and is thus not generally authenticatable on its own, the present disclosure encompasses the recognition that this information can be used by the authentication/authorization tool 105 to improve the accuracy of authenticated data 175a-c that is distributed by the authentication/authorization tool 105. In certain embodiments, the artificial intelligence module 120 monitors data from one or more data feed(s) 155a,b of the second data source(s) 150a,b. For example, the artificial intelligence module 120 may monitor data feed 155a to determine if a probable event or activity has been or will occur for the entity 170 associated with the unofficial data source. The authentication/authorization tool 105 uses this probable event to verify that the authenticated data 175a-c is correct. The probable event may be used to identify when an alert should be transmitted to the entity device 160 for further authorization and/or authentication, as described in greater detail herein, for example, with respect to FIG. 4.

Device 160 tokenizes an authorization generated in response to the user input. The authorization token 165 may include biometric data (e.g., a thumbprint or a retinal scan), which is unique to the entity 170 and can be confirmed by the authentication/authorization tool 105. The authorization token 165 provides permission to the authentication/authorization tool 105 to distribute authenticated data 175a-c to repositories 180, 185, 190 according to the preferences of the entity 170. These preferences may be predefined (e.g., they may have been previously configured by entity 170 and stored in in the entity preferences database 115). The authorization token 165 may include instructions for how authenticated data 175a-c should be distributed to repositories 180, 185, 190. These instructions may include links between portions of the authenticated data 175a-c and specific services or service types associated with repositories 180, 185, 190. In certain embodiments, device 160 communicates with authentication/authorization tool 105 through network 130 via a web interface. In certain embodiments, device 160 communicates with authentication/authorization tool 105 through network 130 via an application executed on the device 160. In some embodiments, device 160 instructs authentication/authorization tool 105 by issuing commands to authentication/authorization tool 105.

Repositories 180, 185, 190 may each include a database for storing one or more tables of information for the entity 170. Repositories 180, 185, 190 may store information arranged in any format. The information stored in repositories 180, 185, 190 may include for example, names, dates of birth, and addresses associated with the entity 170. Data may be distributed (e.g., pushed) to repositories 180, 185, 190 by the authentication/authorization tool 105 either directly (as shown in FIG. 1) or via a network (such as network 130 or some other secure network). In the illustrative example of FIG. 1, the first repository 180 is a repository which entity 170 has indicated is permitted to receive a first data type associated with portion 175a of the authenticated data.

Meanwhile the second data repository 185 and third data repository are similarly permitted to receive a second data type and third data type, respectively. As described elsewhere herein, in the illustrative example of FIG. 1, the first, second, and third data types can correspond to public data, semi-private data, and private data, respectively. Thus, repositories 180, 185, and 190 may be a public repository (e.g., for a social media profile), a semi-private repository (e.g., for professional organization membership), and a private repository (e.g., for banking services or an insurance policy), respectively.

Network 130 facilitates communication between and amongst the various components of system 100. This disclosure contemplates network 130 being any suitable network operable to facilitate communication between the components of system 100. Network 130 may include any interconnecting system capable of transmitting audio, video, signals, data, messages, or any combination of the preceding. Network 130 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

In an example operation of system 100, an entity 170 visits an official third party associated with the first data source 135a to update his/her information. For example, entity 170 may visit a Department of Motor Vehicles office (DMV), where his/her name or place of residence is changed in a network-connected database corresponding to the first data source 135a of FIG. 1. Data 140a of FIG. 1 comprises this update to entity information. As part of this information update, the official third party collects and reviews one or more forms of authentication evidence to verify that the update is authentic. This authentication evidence may include, for example, images of one or more identification cards and/or an identification number (e.g., a social security or driver's license number). This evidence is stored in a digital format and used to generate an authentication token 145. Generally, the authentication token 145a is generated at the first data source 135a to improve security during communication of the authentication information to the authentication/authorization tool 105. However, in some embodiments, tokenization of the authentication evidence is performed by the authentication/authorization tool 105 itself or by an intermediate tokenization module (not shown) communicatively coupled to network 130. The data 140a and authentication token 145a are combined into a data packet, which is received via the network 130 by the authentication/authorization tool 105 (e.g., via a "push" from the first data source 135a or via a "pull" to the authentication/authorization tool 105).

Following receipt of data 140a and authentication token 145a at the authentication/authorization tool 105, the entity 170 may, using device 160, provide an input to generate an authorization token 165 to provide permission and, optionally, instructions for the distribution of data 140a received and authenticated by the authentication/authorization tool 105 to repositories 180, 185, and 190. For example, the authentication/authorization tool 105, upon receiving the authorization token 165, may "de-tokenize" the token 165 to convert it to its original form of authorization information for interpretation and validation by the authentication/authorization tool 105. The authentication/authorization tool 105 may compare a credential stored in the token 165 to a corresponding credential stored in memory 110. For example, after "de-tokenization", the authorization token may include a fingerprint scan of the entity. The tool 105 compares the fingerprint to a fingerprint scan stored in the memory 110. If the fingerprints are the same (i.e., within a predefined threshold, corresponding to a high certainty that the authorization was received from the entity 170), the authentication/authorization tool 105 may distribute the authenticated data 175a-c according to preconfigured preferences of the entity 170 stored in the entity preferences database 115 and/or based on preferences embedded within the authorization token 165.

The authentication/authorization tool 105 generally uses the authentication token 145a and authorization token in combination to transform data 140a into authenticated data portions 175a-c, which are then distributed to repositories 180, 185, 190 according to entity preferences from the entity preferences database 115 and/or the authorization token 165. Upon receipt of the authentication token 145a, data 140a, and authorization token 165, the authentication/authorization tool 105, determines a first portion 175a of the received data 140a corresponding to a first type of data, a second portion 175b of data 140a corresponding to a second type of data, and a third portion 175c of the data 140a corresponding to a third type of data. Authentication token 145a is used to confirm the authenticity of the information (i.e., that the information is indeed associated with the entity 170 rather than an individual posing as the entity).

The authentication token 145a can also be used to score and/or rank the credibility of the data 140a. For example, the token 145a, after being "de-tokenized" may include information about how the data was reviewed at the official third party and the results of this review. For example, a change of address performed at a Department of Motor Vehicles office may include an address confirmation with the United States Postal Service to verify that the address is real and conforms to standard formatting guidelines. If such tasks have been performed, the data 140a may be given a high score and a rank of "highly credible." The authorization token 165 and/or the entity preferences database 115 may, in turn, include instructions for how data should be distributed to repositories 180, 185, 190 based on such scores and/or rankings, which are facilitated by information in the authentication token 145a.

In this illustrative example, the first type of data is public data, i.e., data with a low security sensitivity for the entity 170. For example, the public data might include information such as a name that the entity 170 is comfortable distributing to all repositories 180, 185, 190. The second type of data is semi-private data, i.e., data with a moderate security sensitivity for the entity 170. For example, the semi-private data might include information such as a phone number that the entity 170 is comfortable distributing to a more limited set of repositories, including repositories 185, 190 but that the entity does not wish to reveal to the public. The third type of data is private data, i.e., data with a high security sensitivity for the entity 170. For example, the private data might include information such as a social security number that the entity 170 is comfortable distributing to only a very select set of his/her repositories (i.e., repository 190 of FIG. 1).

Following the determination of these portions of the authenticated data 175a-c, the authentication/authorization tool 105 uses the authorization token 165 and the entity preferences database 115 to determine which repositories, 180, 185, and 190, should receive each portion of the authenticated data. As shown in FIG. 1, the portion of the data corresponding to public data 175a is distributed to each of repositories 180, 185, 190. Meanwhile, the portion of the data corresponding to semi-private data 175b is distributed only to the second repository 185 and the third repository 190. The portion of the data corresponding to private data 175c is distributed only to the third data repository 190.

In the illustrative embodiment of FIG. 1, repository 180 may be considered a "public data repository" that is authorized by the entity 170 to only receive public data. A public data repository may be associated with a service that is publicly accessible, such as a social media profile or another service that is generally viewable by members of the public. Repository 185 may be considered a "semi-private data repository" that is authorized to receive both the public data 175a and the semi-private data 175b. A semi-private data repository may be associated with services which may be accessible to other individuals and/or which may not require sensitive information that is maintained in its most current state. Meanwhile, repository 190 may be considered a "private data repository" that is authorized to receive the public data 175a, semi-private data 175b, and private data 175c. A private data repository may be associated with personal information of the entity. The authentication/authorization tool 105 improves security by only transmitting this personal information to a select subset of repositories, while transmission of the personal information is prevented to other repository types.

Referring now to another embodiment of the present disclosure, the artificial intelligence module 120 may also be used to monitor an unofficial data source 150a for further improvements to the functions of the authentication/authorization tool 105. The artificial intelligence module 120 determines probable events associated with the entity 170 that may impact how data is authenticated and authorized for distribution by the authentication/authorization tool 105. A data feed 155a may be monitored (e.g., in conjunction with an upcoming wedding), for example, to determine if entity 170 has or is likely to soon make a change of name. Data feed 155a may be from a publicly accessible source such as one or more news feed, one or more social media feeds, or the like. Based on this information, the authentication/authorization tool 105 can communicate with the entity 170, for example, by transmitting a message to the entity's device 160 to provide offers of services related to updating his/her name in his/her repositories 190, 185, 190.

The authentication/authorization tool 105 can also use information from the artificial intelligence tool 120 for further authentication or validation of the data 140a received by the authentication/authorization tool 105. For example, if data 140a is associated with the entity 170 changing his/her residential address and the artificial intelligence module 120 determines, based on data feed 155a, that the entity 170 has likely moved (e.g., based on postings to social media about the purchase of a new home and the hiring of movers), the authentication/authorization tool 105 calculates a high confidence score for the received data 140a.

As another example, if the received data 140a is associated with a name change of the entity 170 but the data feed 155a suggests, according to the artificial intelligence module 120, that a name change likely did not occur (e.g., based on social media posts indicating a wedding is canceled), authentication/authorization tool 105 may send an alert to the entity's device 160 to request a confirmation that the received data 140a, associated with a change of name, is correct. Confirmation by the entity involves an input of some additional authorization or authentication information. For example, entity 170 may input a password associated with a repository or provide biometric data (e.g., a thumbprint or a retinal scan) to confirm that data 140*a* is correct. The authentication/authorization may transmit a query regarding the authenticity of the data 140*a* to device 160, and entity 170 may input a response to the query indicating that data 140*a* is correct and should be distributed according to the entity's preferences. Upon receipt of a response indicating that data 140*a* is not authentic, the data 140*a* is not authenticated or authorized for distribution by the authentication/authorization tool 105.

While system 100 is described as including three repositories 180, 185, 190, it should be understood that the system 100 can include one or more additional repositories related to the entity 170. Moreover, while the authentication/authorization tool 105 is described with respect to FIG. 1 as determining three portions of the authenticated data 175*a-c*, where each portion corresponds to a particular data type, it should be understood that the authentication/authorization tool can determined one or more additional portions of the data associated with one or more additional data types. For example, the authenticated data may be distributed according to one or more additional security classes other than public, semi-private, and private. For example, a portion of the data may be determined to be fourth type of data (e.g., very private data), which is not distributed to any of the repositories 180, 185, 190.

Figure 2:
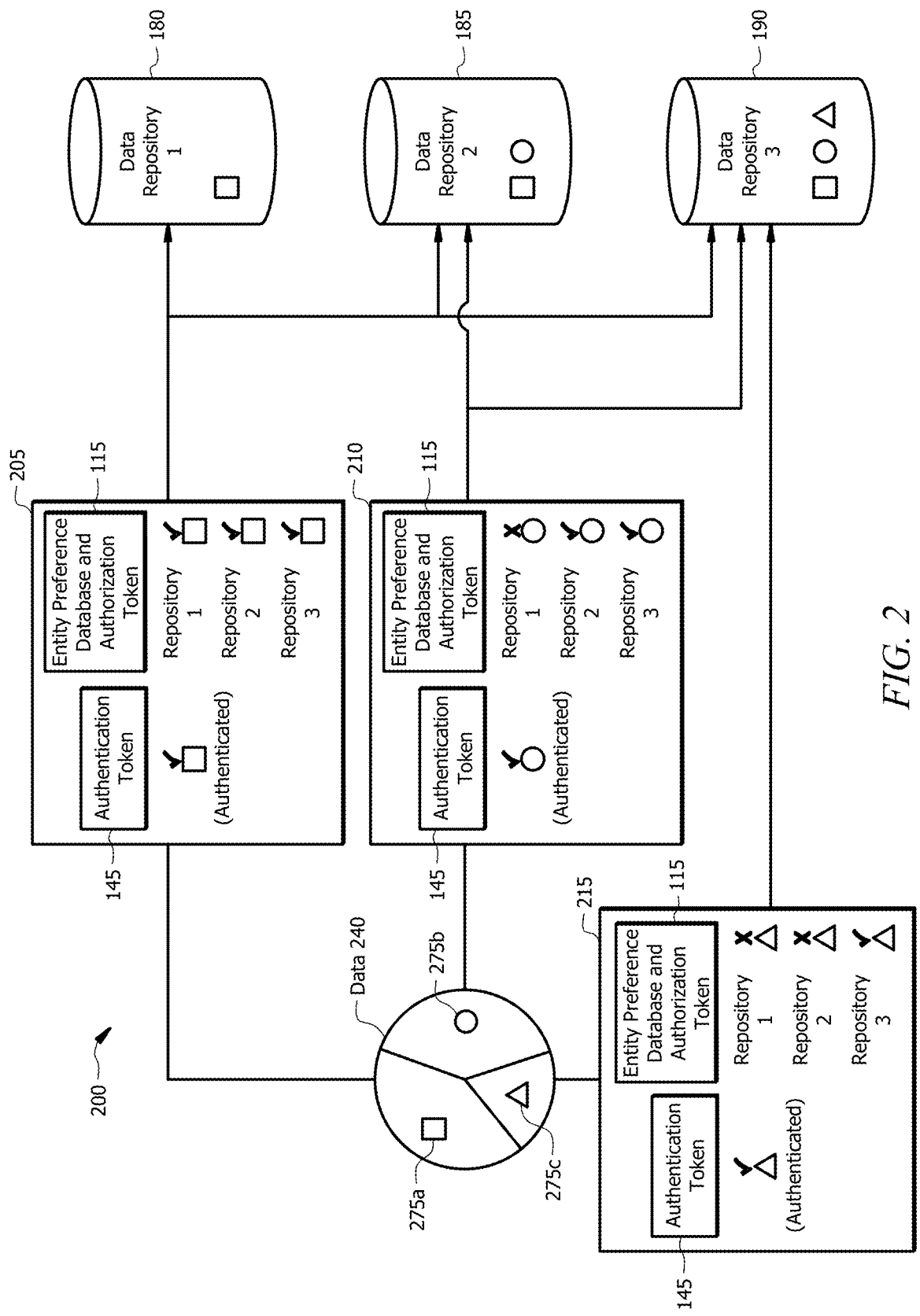
FIG. 2 is a flow diagram illustrating data authentication and authorization of data using the authentication/authorization tool of FIG. 1.

FIG. 2 is a flow diagram 200 illustrating the distribution of authenticated data 240 using the example authentication/authorization tool 105 of FIG. 1. Authenticated data 240 may include, for example, data 140*a,b* from first data sources 135*a,b* and, optionally, data determined by the artificial intelligence module 120 by monitoring second data sources 150*a,b*. In the illustrative example of FIG. 2, the authenticated data 240 includes a first portion 275*a*, second portion 275*b*, and third portion 275*c*, which may correspond to public data, semi-private data, and private data, respectively. In general, the authentication/authorization tool 105 uses authentication token 145 to confirm that the authenticated data 240 is authentic and uses the authorization token 165 to determine the entity's instructions for distributing these data portions 275*a-c* to repositories 180, 185, 190 according to the preferences of the entity.

As shown in box 205 of FIG. 2, for the public data portion 275*a*, the authentication/authorization tool 105 uses the authentication token 145 to first authenticate the public information. As described above, authenticating the data may include "detokenization" of the authentication token 145 and a verification of the authentication evidence stored therein. The authentication/authorization tool 105 then uses the entity preferences database 115 (and optionally the authorization token 165) to determine to which of the repositories 180, 185, 190 data 275*a* can be distributed. Authorization token 165 provides permission for this distribution. As described elsewhere herein, public data generally includes information with a low security sensitivity for the entity such that this data portion 275*a* can generally be provided to each of the entity's repositories 180, 185, and 190. Thus, the authorization token 165 combined with information in the entity preferences database 115 indicates that each repository is approved to receive the public information of data portion 275*a*. The authentication/authorization tool 105 then distributes data portion 275*a* to each of the repositories 180, 185, and 190, as shown in FIG. 2.

A shown in box 210 of FIG. 2, for the semi-private data portion 275*b*, the authentication/authorization tool 105 again uses the authentication token 165 to authenticate the information. The authentication/authorization tool 105 then uses the entity preferences database 115 (and optionally the authorization token 165) to determine to which of the repositories 180, 185, 190 data 275*b* should be distributed. As described elsewhere herein, semi-private data generally includes information with a moderate security sensitivity for the entity, and this data portion 275*b* can generally be provided only to the entity's repositories 185 and 190, which are authorized to receive information with a semi-private designation. Thus, data portion 275*b* is distributed to repositories 185 and 190, as shown in FIG. 2.

As shown in box 215 of FIG. 2, for the private data portion 275*c*, the authentication/authorization tool 105 again uses the authentication token 145 to authenticate the information. The authentication/authorization tool 105 then uses the entity preferences database 115 (and optionally the authorization token 165) to determine to which of the repositories 180, 185, 190 the private information of data 275*c* can be transmitted. As described elsewhere herein, private data generally includes information with a high security sensitivity for the entity, and this data portion 275*c* can generally only be provided only to the entity's repository 190, which is authorized to receive information with a private designation. Thus, data portion 275*c* is distributed only repository 190, as shown in FIG. 2.

While in the illustrative examples of FIGS. 1 and 2, the authentication/authorization tool 105 is described as authenticating each portion of data 240 after individual portions 275*a-c* are determined, it should be understood that the authentication/authorization tool 105 can also or alternatively authenticate the received data 240*a* (e.g., in whole or in part) before the different data portions 275*a-c* are identified. It should also be understood that FIG. 2 is for illustrative purposes, and more than one repository may be authorized to receive each of the data portions 275*a-c*. In other words, each of data repositories 180, 185, 190 of FIGS. 1 and 2 may represent a plurality (i.e., two or more) repositories.

Figure 3:
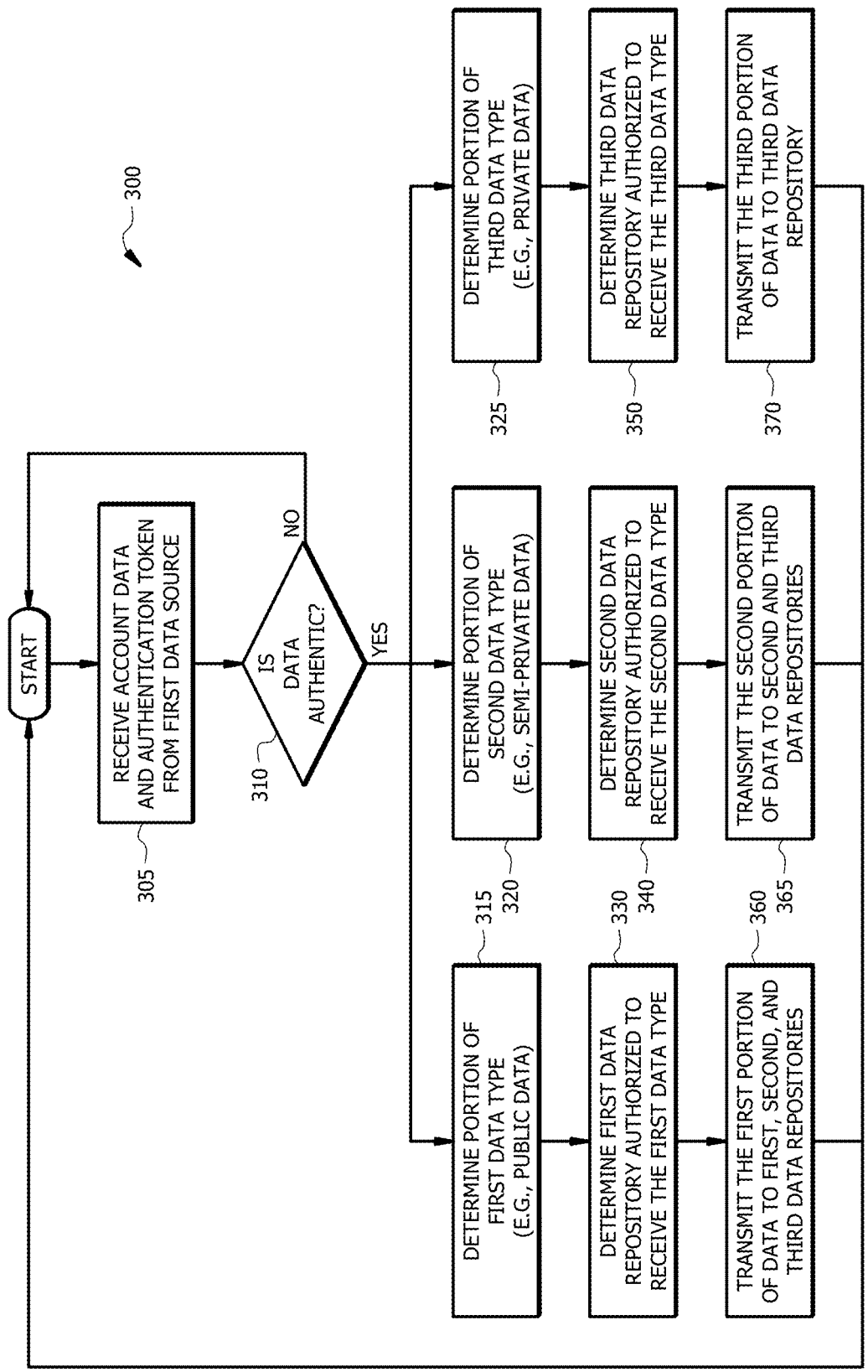
FIGS. 3 and 4 are flowcharts illustrating example methods for authenticating and authorizing data using the system of FIG. 1.

FIG. 3 shows a flowchart illustrating an example method 300 used by the authentication/authorization tool 105 for authenticating data from a first data source 135*a* (e.g., an official data source) and authorizing the secure distribution of appropriate portions of this authenticated data to repositories 180, 185, 190, according to preferences of the entity 170. In step 305, data and an authentication token are received from the first data source. As described above, the received data generally includes information related to the entity 170, such as a name or address associated with the entity 170. The authentication token generally includes evidence in a tokenized format of the authenticity of this information.

In step 310, the authentication/authorization tool 105 authenticates the data using the authentication token from the official third party. For example, the authentication/authorization tool may access the received authentication token and "detokenize" the authentication token in order to convert it into its original form. This allows the authentication evidence to be reviewed and confirmed as correct. In some embodiments, further authentication evidence may be required, and the authentication/authorization tool 105 may transmit a message to the entity device 160 to request further evidence. If the data is found to not be authentic, no further action may be taken for authentication and authorization of the data, and the authentication/authorization tool 105 returns to start to await receipt of further information. Otherwise, if the data is successfully authenticated, the authentication/authorization tool 105 proceeds to steps 315, 320, and 325, described below.

Still referring to FIG. 3, in steps 315, 320, and 325, the authentication/authorization tool 105 determines portions of the data that correspond to a first data type (e.g., public data), a second data type (e.g., semi-private data), and a third data type (e.g., private data), respectively. In step 330, the authentication/authorization tool 105 determines a first data repository that is authorized to receive the first data type. This step is achieved by accessing information stored in the entity preferences database and/or using information from the authorization token (i.e., following the "de-tokenization" of the authorization token to convert it to its original form). Similarly, in steps 340 and 350, the authentication/authorization tool 105 determines, respectively, a second data repository that is authorized to receive the second data type and a third data repository authorized to receive the third data type. Steps 340 and 350 are also be performed by accessing information stored in the entity preferences database and/or using information from the authorization token, as described above for step 330.

In step 360, the authentication/authorization tool 105 transmits the first portion of the data (e.g., the public data) to the first, second, and third data repositories. In step 365, the authentication/authorization tool 105 transmits the second data portion of data (e.g., the semi-private data) to the second and third data repositories. In step 370, the authentication/authorization tool 105 transmits the third data portion (e.g., the private data) to the third data repository only. Thus, private information is not transmitted to the first data repository or the second data repository. In general, by determining separate portions of the data to transmit to each repository, authentication/authorization tool 105 prevents private information from being sent to incorrect repositories and solves reliability and security problems associated with conventional repository management technology.

Modifications, additions, or omissions may be made to method 300 depicted in FIG. 3. Method 300 may include more, fewer, or other steps. For example, steps may be performed in parallel or in any suitable order. While discussed primarily as authentication/authorization tool 105 (or components thereof) performing the steps, any suitable component of the system 100, such as the device 160 or a device of the official data source 135*a* of FIG. 1 for example, may perform one or more steps of the methods.

Figure 4:
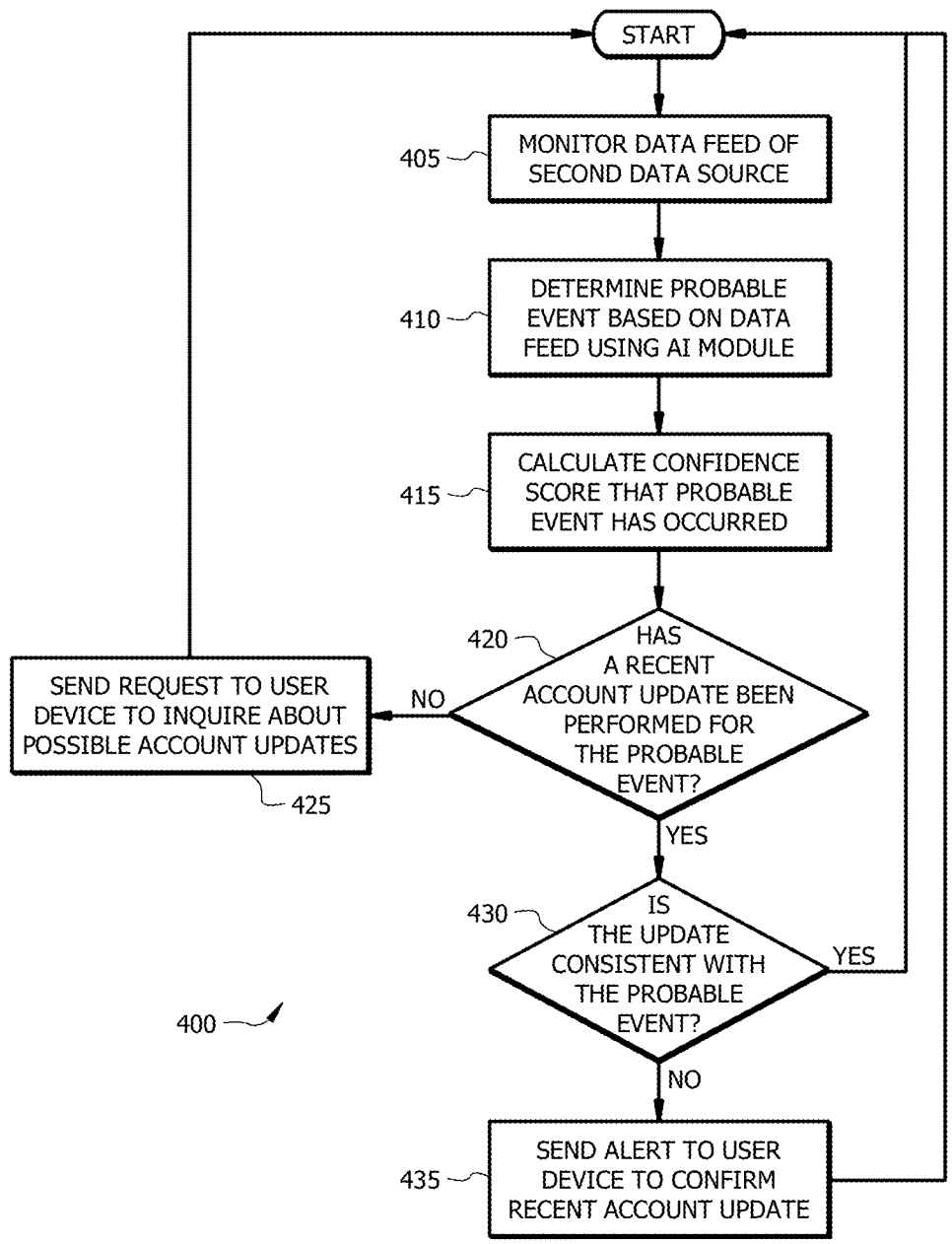

FIG. 4 is a flowchart illustrating a method 400, in which the authentication/authorization tool 105 monitors a second data source 150*a* (e.g., a social network feed or news feed) to determine information that can be used to further improve the authentication of data received from an official data source and authorization of the distribution of the authenticated data by the authentication/authorization tool 105. In general, method 400 can be performed by the authentication/authorization tool 105 after or during method 300 shown in FIG. 3 in order to further improve the overall performance and reliability of processes performed by the authentication/authorization tool 105.

In step 405, the authentication/authorization tool 100 monitors the data feed 155*a* of the second data source 150*a*. Monitoring the data feed generally involves continuously accessing information stored in and posted to the data feed 155*a*. Data feed 155*a* may, for example, be a social network feed of the entity 170 or a news feed containing information related to entity 170.

In step 410, the artificial intelligence module 120 of the authentication/authorization tool 105 determines a probable event or activity for the entity 170 based on the data feed 155*a*. For example, as described in greater detail herein, the artificial intelligence module 120 may determine that the entity 170 is likely to have moved to a new place of residence based on posts in social media indicating the purchase of a new home. Similarly, social media posts about a wedding may indicate that a name change may be likely for the entity 170 in the near future.

In step 415, the authentication/authorization tool 105 calculates a confidence score that this probable event or activity has occurred or is likely to occur. For example, the artificial intelligence module 120 may estimate how likely it is that a given event has happened, based on information in the data feed 155*a*. In a more particular example, a social media feed may include postings that not only suggest that the entity 170 has purchased a new home but that including corroborating evidence for this move such as an address of the new home along and/or details of moving to the new home. In this case, the artificial intelligence module may calculate a high confidence score that the individual is likely to have had a change of address.

In step 420, the authentication/authorization tool 105 determines whether a recent update has been performed that is associated with the probable event or activity determined in step 410. The update may have been performed by the authentication/authorization tool 105 (e.g., using method 300 described above) or by the entity 170. In general, the authentication/authorization tool 105 determines whether a recent update has been performed that is associated with the probable event by determining if data recently received is associated with probable event determined in step 410. If no such data has been received, then the authentication/authorization tool 105 may send a request to the entity device 160 to inquire about possibly updating information in the entity's repositories to update the information stored therein, in step 425.

Otherwise, if a related update has occurred, the authentication/authorization tool proceeds to step 430 in which the authentication/authorization tool 105 determines whether the update is consistent with the probable event. For example, if the entity 170 recently updated his/her place of residence to a location in California but the artificial intelligence module 120 has determined that the entity 170 likely moved to New York (e.g., based on social media posts discussing an upcoming move to New York), the authentication/authorization tool 105 would determine that the update is not consistent with the probable event. When this happens, the authentication/authorization tool 105 may, in step 435, transmit an alert or query to the entity device 160 to confirm whether the recent updates are correct. The entity may respond to the alert or query as described above. Otherwise, if the update is consistent with the probable event, the authentication/authorization tool 105 may take no further action and return to monitoring the second data source 150*a*. Accordingly, method 400 shown in FIG. 4 provides further technical benefits by providing a second layer of verification to any information changed in repositories 180, 185, 190 and thereby further improves the reliability and accuracy of information authenticated and authorized to be distributed by authentication/authorization tool 105.

Modifications, additions, or omissions may be made to method 400 depicted in FIG. 4. Method 400 may include more, fewer, or other steps. For example, steps may be performed in parallel or in any suitable order. While primarily discussed as automation tool 105 (or components thereof) performing the steps, any suitable component of the system 100, such as the device 160 or a device of the official data source 135*a* of FIG. 1 for example, may perform one or more steps of the methods.

As described above, the systems, methods, and apparatus of the present disclosure provide various advantages for authenticating entity data and authorizing distribution of the authenticated data according to the entity's preferences. It should be understood that these examples are presented for illustrative purposes. Any particular advantage described herein does not need to be achieved in order to realize a benefit from the systems, methods, and apparatus described herein.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. An apparatus for authenticating entity data received from an official third party and authorizing distribution of the entity data to a plurality of data repositories, the apparatus comprising:
   a memory configured to store an entity preferences database; and
   an authentication and authorization tool comprising a hardware processor communicatively coupled to the memory, the authentication and authorization tool configured to:
   receive, via a network, a data packet for a first service from a first data source of the official third party, the data packet comprising entity data and a data authentication token;
   receive, via the network, a data authorization token for the first service from a mobile device of an entity;
   determine, based on the entity data and the entity preferences database, a first portion of the entity data that is of a first data type and a first data repository that is authorized to receive the first data type;
   determine, based on the entity data and entity preferences database, a second portion of the entity data that is of a second data type and a second data repository that is authorized to receive the second data type;
   determine, based on the entity data and entity preferences database, a third portion of the entity data that is of a third data type and a third data repository that is authorized to receive the third data type;
   determine, based on the data authorization token, whether distribution of the entity data is authorized; and
   responsive to a determination that distribution of the entity data is authorized:
   transmit the first portion of the entity data to the first data repository, the second data repository, and the third data repository to update information stored therein;
   transmit the second portion of the entity data to the second data repository and the third data repository to update information stored therein;
   prevent transmission of the second portion of the entity data to the first data repository;
   transmit the third portion of the entity data to the third data repository to update information stored therein; and
   prevent transmission of the third portion of the entity data to the first and second data repositories, thereby improving efficiency, security, and accuracy of updating and maintaining information stored in the first, second, and third data repositories.

2. The apparatus of claim 1, wherein the authentication and authorization tool is further configured to generate tokenized entity data based on the entity data, the data authentication token, and the data authorization token.

3. The apparatus of claim 1, wherein the apparatus further comprises
   an artificial intelligence module; and
   the authentication and authorization tool is further configured to:
   monitor a second data source via the network using the artificial intelligence module;
   determine, based on the monitored second data source, an occurrence of a probable event for the entity using the artificial intelligence module; and
   determine a confidence score for the probable event using the artificial intelligence module.

4. The apparatus of claim 3, wherein the authentication and authorization tool is further configured to transmit a request to the mobile device of the entity to confirm the probable event.

5. The apparatus of claim 3, wherein the authentication and authorization tool is further configured to validate authenticity of the entity data based at least in part on the probable event and the confidence score.

6. The apparatus of claim 3, wherein the second data source comprises at least one social network feed.

7. The apparatus of claim 1, wherein the authentication and authorization tool is further configured to:
   determine a second service for a second entity that is associated with the first service; and
   transmit one or more members selected from the group consisting of the first portion, the second portion, and the third portion of the entity data to a repository of the second service to update information stored therein.

8. A method for authenticating entity data received from an official third party and authorizing distribution of the entity data to a plurality of data repositories, the method comprising:
   receiving, by a hardware processor of a computing device, a data packet for a first service from a first data source of the official third party, the data packet comprising the entity data and a data authentication token, receiving, by the hardware processor, a data authorization token for the first service from a mobile device of an entity;
   determining, by the hardware processor, based on the entity data and an entity preferences database, a first portion of the entity data that is of a first data type and a first data repository that is authorized to receive the first data type;
   determining, by the hardware processor, based on the entity data and the entity preferences database, a second portion of the entity data that is of a second data type and a second data repository that is authorized to receive the second data type;
   determining, by the hardware processor, based on the entity data and the entity preferences database, a third portion of the entity data that is of a third data type and a third data repository that is authorized to receive the third data type;
   determining, based on the data authorization token, whether distribution of the entity data is authorized; and
   responsive to determining that distribution of the entity data is authorized:

transmitting, by the hardware processor, the first portion of the entity data to the first data repository, the second data repository, and the third data repository to update information stored therein;
transmitting, by the hardware processor, the second portion of the entity data to the second data repository and the third data repository to update information stored therein;
preventing transmission of the second portion of the entity data to the first data repository;
transmitting, by the hardware processor, the third portion of the entity data to the third data repository to update information stored therein; and
preventing transmission of the third portion of the entity data to the first and second data repositories, thereby improving efficiency, security, and accuracy of updating and maintaining information stored in the first, second, and third data repositories.

9. The method of claim 8, further comprising generating, by the processor, tokenized entity data based on the entity data, the data authentication token, and the data authorization token.

10. The method of claim 8, further comprising:
monitoring, by the processor, a second data source via the network using an artificial intelligence module;
determining, by the processor, based on the monitored second data source, an occurrence of a probable event for the entity using the artificial intelligence module; and
determining, by the processor, a confidence score for the probable event using the artificial intelligence module.

11. The method of claim 10, further comprising:
determining, by the processor, whether the confidence score is greater than or equal to a threshold value; and
responsive to determining the confidence score is greater than or equal to the threshold value, transmitting, by the processor, a request to the mobile device of the entity to confirm the probable event.

12. The method of claim 10, further comprising validating, by the processor, authenticity of the entity data based at least in part on the probable event and the confidence score.

13. The method of claim 10, wherein the second data source comprises at least one social network feed.

14. The method of claim 8, further comprising:
determining, by the processor, a second service for a second entity that is associated with the first service; and
transmitting, by the processor, one or more members selected from the group consisting of the first portion, the second portion, and the third portion of the entity data to a repository of the second service to update information stored therein.

15. A system for authenticating entity data received from an official third party and authorizing distribution of the entity data to a plurality of data repositories, the system comprising:
an entity preferences database; and
an authentication and authorization tool comprising:
a memory configured to store an entity preferences database; and
a hardware processor communicatively coupled to the memory, wherein the authentication and authorization tool is configured to:
receive, via a network, a data packet for a first service from a first data source of the official third party, the data packet comprising the entity data and a data authentication token, receive, via the network, a data authorization token for the first service from a mobile device of an entity;
determine, based on the entity data and the entity preferences database, a first portion of the entity data that is of a first data type and a first data repository that is authorized to receive the first data type;
determine, based on the entity data and entity preferences database, a second portion of the entity data that is of a second data type and a second data repository that is authorized to receive the second data type;
determine, based on the entity data and entity preferences database, a third portion of the entity data that is of a third data type and a third data repository that is authorized to receive the third data type;
determine, based on the data authorization token, whether distribution of the entity data is authorized; and
responsive to a determination that distribution of the entity data is authorized:
transmit the first portion of the entity data to the first data repository, the second data repository, and the third data repository to update information stored therein;
transmit the second portion of the entity data to the second data repository and the third data repository to update information stored therein;
prevent transmission of the second portion of the entity data to the first data repository;
transmit the third portion of the entity data to the third data repository to update information stored therein; and
prevent transmission of the third portion of the entity data to the first and second data repositories, thereby improving efficiency, security, and accuracy of updating and maintaining information stored in the first, second, and third data repositories.

16. The system of claim 15, wherein the authentication and authorization tool is further configured to generate tokenized entity data based on the entity data, the data authentication token, and the data authorization token.

17. The system of claim 15, wherein the system further comprises an artificial intelligence module; and
the authentication and authorization tool is further configured to:
monitor a second data source via the network using the artificial intelligence module;
determine, based on the monitored second data source, an occurrence of a probable event for the entity using the artificial intelligence module; and
determine a confidence score for the probable event using the artificial intelligence module.

18. The system of claim 17, wherein the authentication and authorization tool is further configured to transmit a request to the mobile device of the entity to confirm the probable event.

19. The system of claim 17, wherein the authentication and authorization tool is further configured to validate authenticity of the entity data based at least in part on the probable event and the confidence score.

20. The system of claim 15, wherein the authentication and authorization tool is further configured to:
determine a second service for a second entity that is associated with the first service; and
transmit one or more members selected from the group consisting of the first portion, the second portion, and the third portion of the entity data to a repository of the second service to update information stored therein.

\* \* \* \* \*